Figure 1:
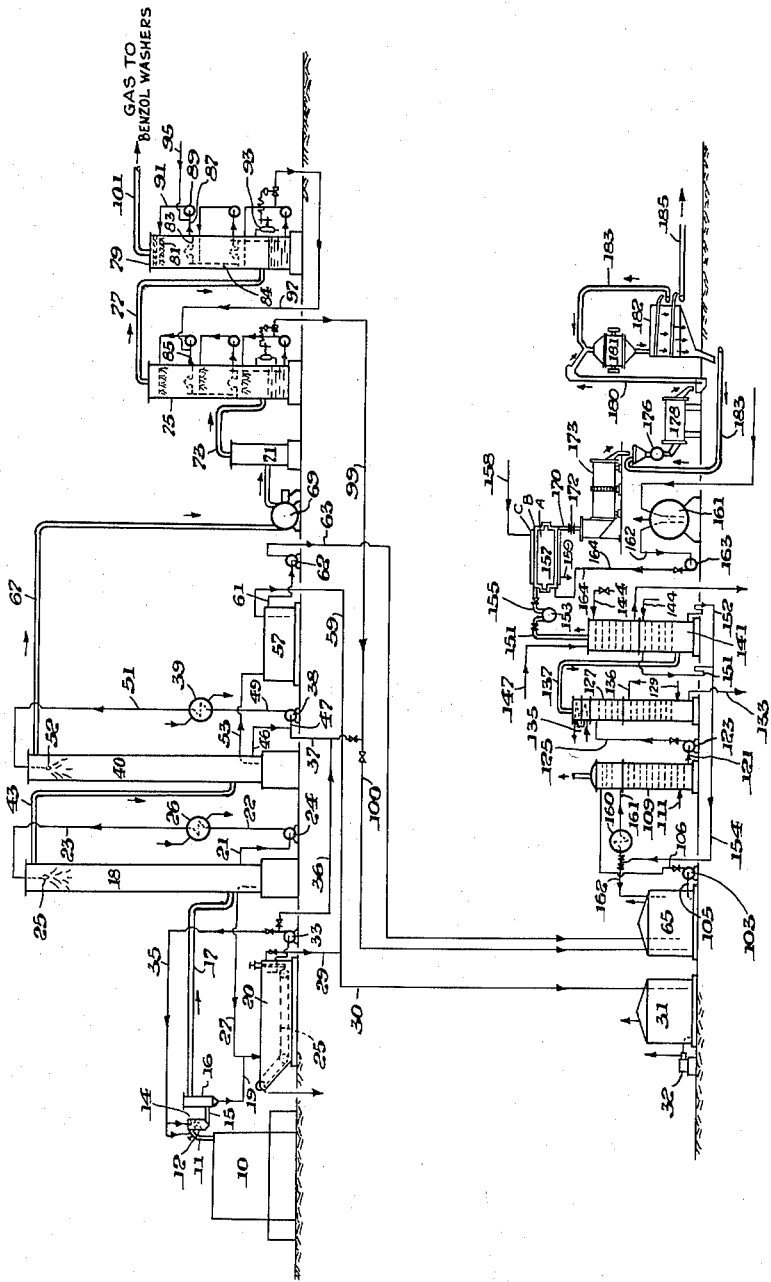

Feb. 7, 1961  E. J. HELM ET AL  2,970,888
DIAMMONIUM PHOSPHATE PRODUCTION
Filed May 3, 1957  2 Sheets-Sheet 1

INVENTORS.
EDWARD J. HELM, and
ELWOOD V. SCHULTE.
BY
Oscar B Brumback
their
ATTORNEY.

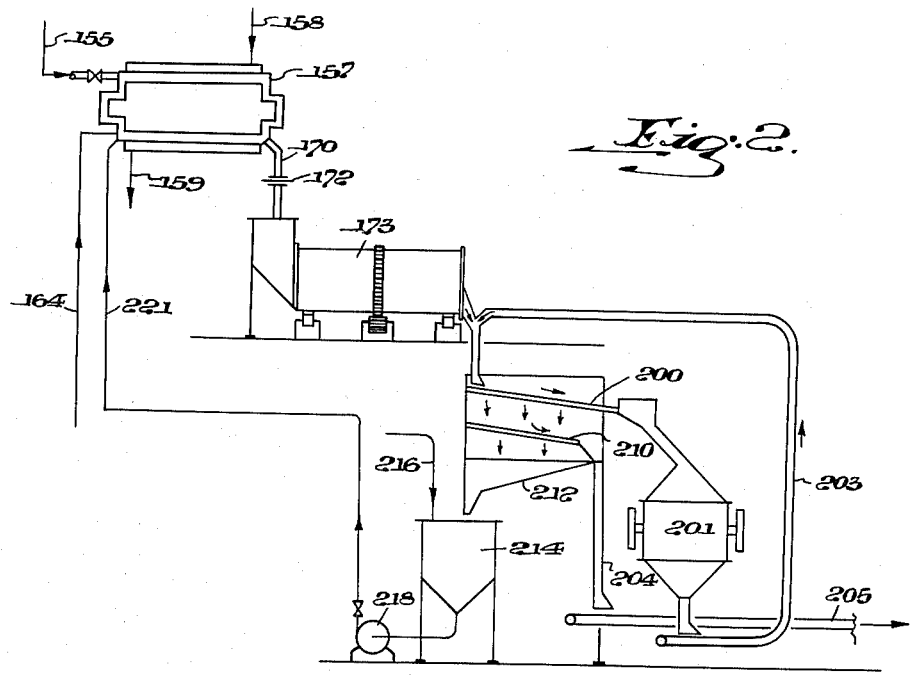
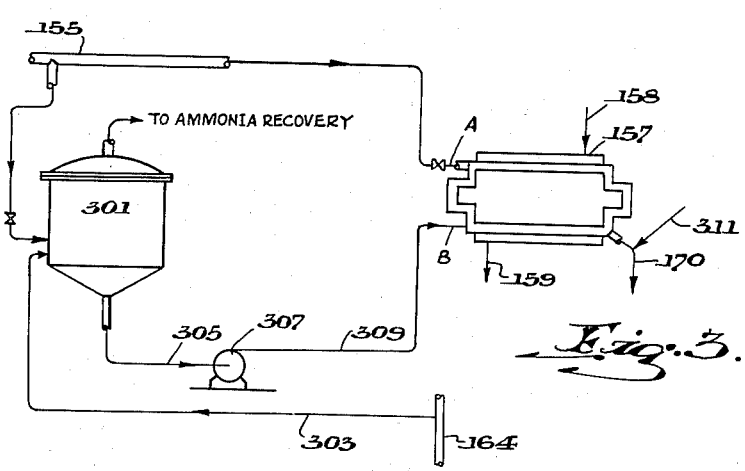

United States Patent Office 2,970,888
Patented Feb. 7, 1961

2,970,888
DIAMMONIUM PHOSPHATE PRODUCTION

Edward J. Helm and Elwood V. Schulte, Pittsburgh, Pa., assignors to Koppers Company, Inc., a corporation of Delaware Filed May 3, 1957, Ser. No. 656,955
9 Claims. (Cl. 23—107)

This invention relates generally to the production of diammonium phosphate from the ammonia in coke oven gas.

Heretofore, the production of diammonium phosphate from the ammonia in coke oven gas has involved spraying the gas with a solution which was saturated with respect to its content of diammonium phosphate and which had its pH value regulated with phosphoric acid so as to maintain the salt produced by the absorption of ammonia from the coke oven gas in the form of diammonium phosphate. As this absorption of ammonia caused the solution to reach a condition of supersaturation, the solution was collected and contacted with a bed of previously formed diammonium phosphate crystals. This released the supersaturation so that the excess diammonium phosphate was deposited on the crystals; the crystals grew in size, and were removed from the solution when they reached a predetermined size. Thereafter, the crystals were dried by means of centrifugal dryers, and sold as a crystalline product.

Although the foregoing process works well, it has a number of disadvantages. Since the ammonia content of the coke oven gas is usually between 1 and 2 percent by volume, a relatively large crystallizing and absorbing apparatus must be used to obtain a satisfactorily high removal of ammonia from the gas. Also, these large surfaces which are in contact with the solution must be made from expensive alloys, since the acid-containing solutions are corrosive. Furthermore, since iron, aluminum, and other impurities of this type form a precipitate that is in the nature of slime and is difficult to remove, such impurities must either be removed before the diammonium phosphate is crystallized or else acid free of these impurities must be used and such relatively pure phosphoric acid is expensive. The diammonium phosphate is removed from the solution by crystallization since an evaporation process would require the removal of relatively large amounts of water.

An object of the present invention, therefore, is to provide a novel and economical process for producing diammonium phosphate from the ammonia in coke oven gas.

Another object is to provide a novel process wherein wet process phosphoric acid containing one or more percent of iron and aluminum can be used for the production of diammonium phosphate from the ammonia in coke oven gas.

The present invention contemplates the recovery of the ammonia in coke oven gas as diammonium phosphate by a novel process involving scrubbing the coke oven gas with water to absorb the ammonia in the water, thereafter removing from the scrubbing water the other constituents which the water inherently absorbs from the gas, then removing the ammonia from the water to provide ammonia vapor of high purity, and contacting the ammonia vapor with concentrated phosphoric acid at a predetermined ratio and under a controlled pH value with agitation and cooling to provide a paste or slurry. The slurry may be dried and granulated to provide particles of the desired size.

The above and further objects and novel features of the invention will appear more fully from the following detailed description when the same is read in connection with the accompanying drawing. It is to be expressly understood, however, that the drawing is not intended as a definition of the invention but is for the purposes of illustration only.

In the single sheet of drawing wherein like parts are marked alike:

Figure 1 schematically illustrates the apparatus for carrying out the invention;

Figure 2 schematically illustrates another embodiment of the invention; and

Figure 3 schematically illustrates still another embodiment.

In the preferred embodiment of the apparatus shown in Figure 1, the coke oven gas is washed with water to absorb the ammonia from the gas. Thus, the gas from a coke oven 10 flows through an ascension pipe 11 to a collecting main 12 where spray units 14 spray the gases with ammonical or flushing liquor and thereby cool the gas to a temperature of about 75° C. Some tar condenses at this temperature and collects along with excess flushing liquor at the bottom of the collecting main 12. A substantial portion, for example about twenty percent, of the ammonia in the coke oven gas is absorbed in this flushing liquor.

The gas and the mixture of flushing liquor (with the condensed moisture and absorbed ammonia) and tar flows along a conduit 15 and to a downcomer 16. The gas and the mixture of liquids separate at downcomer 16 and thereafter flow in different paths; the gas flowing through conduit 17 to a primary cooler 18, and the liquid mixture flowing through pipe 19 to a flushing liquor decanter 20. About three quarters of the tar in the gas is recovered at downcomer 16, the other quarter is recovered at other portions of the system.

In primary cooler 18, the gas is cooled to about 50° C. by contact with water which is recirculated by way of lines 21, 22 and 23, pump 24 and spray 25 and which is cooled by a conventional indirect cooler 26. More tar and water vapor condenses out of the gas in cooler 18; the condensed water vapor accumulates at the rate of about fifty gallons per ton of coal carbonized (this, of course, depends upon the moisture and oxygen content of the coal and on the moisture content and temperature of the gas entering the primary cooler 18). The liquor from cooler 18 is conducted by way of a line 27 to the line 19 which leads to decanter 20.

The tar and the liquid are separated in decanter 20. The tar is heavier than the ammonia liquor; therefore, as tar and ammonia liquor reach the decanter, the tar sinks to the bottom of the decanter and the ammonia liquor rises to the top. Any coal and coke dust settles to the very bottom of the decanter and is scraped out by a drag conveyor 25 which is indicated by the dotted line in the decanter. The tar is flowed from a point near the bottom of decanter 20 through lines 29 and 30 to a suitable tar storage tank 31 and then by way of a pump 32 to a suitable tar processing plant, not shown. The ammonia liquor is flowed from the top decanter 20 to a pump 33.

By way of pump 33, the major portion of the ammonia liquor from decanter 20 is recirculated through a line 35 back to sprays 14 to cool the hot gas and saturate the gases with water vapor; the unevaporated part of this portion may drain directly to decanter 20 or it may travel as entrained mist to the primary cooler 18 where it mixes with the condensates and is returned by line 27 to decanter 20. The minor portion of the flushing liquor, i.e., the excess water, is delivered by lines 36 and 37 to a pump 38 and is sent through a conventional indirect cooler 39 to a secondary cooler 40.

About one quarter of the tar coming from the coke ovens leaves downcomer 16 as a foggy vapor in the coke oven gas and by way of duct 17 enters into the lower portion of primary cooler 18 with the gas. Cooler 18 may be of a conventional type, i.e., a tall tower packed with horizontal layers of wooden "hurdles." The ammonia liquor from sprays 25 at the top of the tower cascades down over the packing to wash and cool the gas, thereby condensing water vapor from the gas, absorbing ammonia and trapping more tar. A decanter (not shown) in the bottom of primary cooler 18 makes a rough separation of the ammonia liquor and the tar. The tar and excess liquor flow from the base of the primary cooler through line 27 to decanter 20. The ammonia liquor also flows from the base of the primary cooler 18 through line 21 to pump 24 which forces the liquor through cooler 26 where it is cooled sufficiently for recirculation back to sprays 25.

By way of conduit 43 the gas is conducted from the top of primary cooler 18 to the bottom of secondary cooler 40 which is similar to the primary cooler 18. Water is recirculated in this cooler by way of line 46, line 47, pump 38, line 49, cooler 39, line 51 and sprays 52. In secondary cooler 40, the gas is further cooled; and the tar and liquor from the secondary cooler is led through line 53 to another decanter 57. By way of lines 59 and 30, the tar is sent from decanter 57 to storage tank 31; and the ammonia liquor is sent by way of line 61, pump 62 and line 63 to an ammonia liquor storage tank 65.

The tar that is present in the gas in the form of fog is difficult to remove from the gas. The washing of the gas in the primary and secondary coolers is only partially effective in the tar removal so that approximately one percent of the tar originally present in the gas still remains in the gas. The gas is passed through line 67 and exhauster 69 (conventionally a large centrifugal compressor which creates the suction on the line from ascension pipe 11). The gas is compressed in exhauster 69 and sent to a conventional tar precipitator 71 where the tar which still remains in the gas is removed.

If desired, the gas from tar precipitator 71 may be contacted with an absorbent oil in a naphthalene scrubber (not shown) so that there will be no naphthalene in the lines or towers located in the gas stream thereafter.

In the embodiment shown in Figure 1, however, a duct 73 feeds the gas from precipitator 71 to the lower portion of a scrubber 75. The gas flows upwardly through scrubber 75 and by way of line 77 enters the lower portion of a second scrubber 79. These scrubbers 75 and 79 may be identical. In each scrubber, the gas flows upwardly and countercurrently to water flowing downwardly; each scrubber also includes a plurality of stages for spraying the water into contact with the gas, collecting the water and spraying it again in each stage, and for overflowing water onto the next adjacent lower stage. In scrubber 79, for example, each stage includes sprays 81 wherein the solution is sprayed into contact with the gas, a collection zone 83 for collecting the sprayed solution, a line 84 for the overflow of solution from one stage to another and line 87, pump 89 and line 91 for sending the solution back to sprays 81. Each scrubber also includes a conventional liquid level control 93 for controlling the level of the liquid which accumulates at the bottom of each scrubber. Fresh water is added to line 87 of scrubber 79 by way of line 95, and solution from the bottom of scrubber 79 is added to line 85 of scrubber 75 by way of line 97. The solution from the bottom of scrubber 75 is flowed by way of line 99 either to line 37 as make-up water for the secondary cooler 40 or by way of line 100 to the ammonia liquor storage tank 65. Thus, the gas which leaves scrubber 79 at line 101 is substantially free of ammonia, the ammonia having been absorbed from the gas by the countercurrent flow of solution and gas in the scrubbers; and the solution conducted from scrubber 75 by way of line 99 to tank 65 is partially saturated with ammonia at the existing conditions with respect to solution temperature and to the partial pressure of the ammonia in the gas entering the scrubber at line 73.

The weak, ammonia-containing liquor in tank 65 usually contains 5–15 grams of total ammonia per liter of solution. This total ammonia includes both the free ammonia and the fixed ammonia; the ammonia usually being about 70–80% free ammonia, and 20–30% fixed ammonia. The free ammonia exists as carbonates, sulfides, cyanides, and hydroxides of ammonia and readily decomposes into carbonic acid, hydrogen sulfide, hydrogen cyanide, ammonia and water.

To purify the solution of tank 65 of compounds other than ammonia, the solution may be treated in a conventional dephenolizer (not shown) and then pumped to a conventional ammonia purifier such as purifier 109.

In Figure 1, the liquor is pumped from tank 65 by pump 103 and lines 105 and 106 to ammonia purifier 109, where acid gases such as $H_2S$, $CO_2$ and $HCN$ are stripped from the liquor by steam which is introduced at the bottom of the purifier by way of line 111. If the temperature of the acid gases leaving the top of the ammonia purifier are maintained at about 25° to 30° C., practically no ammonia escapes. These gases may be burned in a stack (not shown) or processed to convert the $H_2S$ therein to sulfuric acid. However, if the temperatures of these exit gases be allowed to go as high as 50° C., some ammonia will escape with the gases and, while not shown in the drawing, it may then be advisable to return these gases to the coke oven gas stream ahead of the ammonia scrubbers 75 and 79 to recover this ammonia.

The partially purified ammonia liquor is pumped from the base of the ammonia purifier 109 by way of line 121, pump 123 and line 125 to a conventional ammonia still 127 where it is contacted countercurrently with stripping steam supplied by way of line 129. Milk of lime also may be added by way of line 136 to this liquor, as it is being steam stripped, to free the fixed ammonia therein. The waste liquor removed from line 133 at the base of this still is substantially free of ammonia. Some dephlegmation is usually practiced at the top of the still by the use of cooling coils 135 to limit the steam content in the ammonia vapors carried by way of line 137 to the ammonia washer 141 next in the line of ammonia purification.

In the ammonia washer 141, the ammonia and steam vapors are cooled with indirect cooling water supplied by way of lines 144. Some wash water by way of line 147 is usually added directly to the top or exit end of this washer. The condensates, which form in this washer, contain the remaining impurities of $H_2S$, $CO_2$ and $HCN$ and some ammonia and are withdrawn by lines 151 and 152, combined into line 154. This condensate may either be vaporized by vaporizer 160 and the vapors fed by line 161 into the ammonia purifier or may be returned by line 162 to the storage tank 65.

The cool relatively pure ammonia gas that leaves the top of the ammonia washer by way of line 151 usually contains less than ten percent water vapor. This ammonia vapor is fed to a compressor 153 which forces the gas through line 155 into the agitator cooler 157.

Agitator cooler 157 may be of the type wherein a rotor A is mounted in a housing B and has a number of blades for scraping the interior surfaces of housing B, thereby preventing the accumulation of a crust or scale on the interior, and increasing the heat transfer from the surface of housing B to the material carried in the space between rotor A and housing B. Housing B is enclosed in a jacket C and cooling water is supplied to the jacket by way of line 158 for extracting the heat which is involved in the reaction within the space between rotor A and housing B. The heated water is discharged at line 159.

In or at the entrance to agitator cooler 157, the gas is contacted with phosphoric acid supplied from a storage tank 161 by way of line 162, pump 163 and line 164. The contact of ammonia and phosphoric acid takes place in agitator cooler 157 under controlled pH and temperature conditions to produce a slurry or mudlike precipitate of diammonium phosphate and the heat of reaction and crystallization is removed as rapidly as possible using a cooling medium such as water, applied by lines 158 and 159 indirectly to the cooling surfaces of the agitator cooler. The pH of diammonium phosphate slurry is maintained between the limits of about 5.5 to 8.0, and the mol ratios of ammonia input to phosphoric acid input at 2:1. The temperature at the entrance of the agitator cooler is maintained preferably below the boiling point of the solution. The rapid cooling and agitation produces crystal sizes so small as to be maintained in suspension in the liquid.

The cooled, freshly-formed, precipitated diammonium phosphate discharges from the agitator cooler as a flowable slurry or paste, advantageously the consistency of tooth paste, and through line 170 and extruding valve 171 into a conventional dryer 173 where most of the water in the paste is removed by evaporation. The material is dried sufficiently so that it may be compacted satisfactorily in sheet form in a compactor 176 that follows.

Compactor 176 may be of a conventional roller type for forming the paste from dryer 173 into a sheet which is fed to a conventional dryer 178. The material is aged as needed in dryer 178 to provide permanent hardness to the compacted material. This material is next fed by a suitable conveyor 180 to a conventional grinding mill 181 to be broken into suitable sized granules. The granulated material is sized on a suitable multi-deck screen 182. Any oversized material (usually plus 8 mesh U.S. Standard) is returned by a suitable conveyor 183 to the granulating mill. The undersized material (usually less than 20 mesh U.S. Standard) is returned by a suitable conveyer 183 to the compactor 176. The granules having the desired size are delivered by a suitable conveyor to storage or to boxcars for shipment.

In some instances, the compactor and curing dryer may not be required as in the embodiment of the invention shown in Figure 2. The output of the agitator cooler 157 is applied by way of line 170 and extruding valve 171 to the kiln dryer 173 as in Figure 1. The output from kiln dryer 173 of Figure 2, however, is screened by a screen 200; the oversized particles which remain on screen 200 are sent through a grinding mill 201 and by a suitable conveyor 203 returned to screen 200, the particles which pass through screen 200 and remain on screen 210 are of the desired size and are sent to storage by way of chute 204 and a suitable conveyer 205; the material which falls through screen 210 is undersized and is fed by a hopper 212 to a mixing tank 214 in which water is added by way of conduit 216. The undersized material is dissolved in tank 214 and is pumped by way of pump 218 and line 221 to the inlet of the agitator cooler 157.

When the size of the equipment and/or the cooling medium must be kept at a minimum, the embodiment of the invention shown in Figure 3 may be utilized. The vapors comprised of relatively pure ammonia and water are obtained at line 155 as in Figure 1 and are conducted both to the agitator cooler 157 and to a suitable reaction vessel such as a conventional commercial saturator 301. The vapors are contacted in saturator 301 with the concentrated phosphoric acid which is fed to the saturator from line 164 by way of line 303. The exothermic reaction of the ammonia and the phosphoric acid maintains the solution in the saturator at or near the boiling point of the solution. By way of line 305, pump 307 and line 309, this hot solution is fed to the input of agitator cooler 157. Additional phosphoric acid may be added to the agitator cooler by way of line 164 and additional ammonia may be added to the agitator cooler by way of line 155 so that the ratio of ammonia to equivalent phosphoric acid is about 2 to 1.

In the operation of the embodiment of the invention in Figure 3, the vapor of relatively pure ammonia and water is absorbed in commercial phosphoric acid in a reaction vessel or saturator 301 under conditions of concentration such that a high concentration of ammonium phosphate is formed thereby but the salt remains in solution at or near the boiling point of the solution. Advantageously, the mol ratio of ammonia to phosphoric acid in the solution is maintained at about 1.5:1 as the solubility of the ammonium phosphate is a maximum at this ratio on the vapor pressure of the ammonia above the solution is not unduly great. This highly concentrated solution is next fed to the agitator cooler 157 and treated with additional ammonia to produce a mixture having a mol ratio of ammonia to $H_3PO_4$ equivalent to about 2 to 1. This additional quantity of ammonia to adjust the mol ratio of ammonia to phosphoric acid to the desired value may be accomplished by feeding the ammonium phosphate solution and the additional ammonia into separate inlet connections A and B at the agitator cooler. By controlling the entrance temperature of the agitator cooler to below the boiling point of the mixture, the loss of ammonia is minimized and yet the desired high ratio of ammonia to phosphoric acid is obtained in the mixture leaving the agitator cooler. The further cooling of the mixture in the agitator cooler forms the precipitated, cooled, mudlike ammonium phosphate slurry. By way of line 311, potassium chloride or other desirable fertilizer may be added to the slurry discharging from the agitator cooler when it is desired to produce a complete, balanced fertilizer. This slurry is then sent to dryer 173 and further processed to obtain granules of diammonium phosphate as in the embodiments of Figure 1 or Figure 2.

The foregoing has presented a novel process for the production of diammonium phosphate from the ammonia of coke oven gas. The ammonia is inexpensively removed from the gas by water in scrubbers which can use inexpensive carbon steel alloy or low-alloy steel for the scrubbing towers. Thereafter, the ammonia is distilled from the scrubbing solution in conventional apparatus, separated from the scrubbing operation, so that a relatively pure ammonia gas is produced. The actual precipitation of the diammonium phosphate takes place in apparatus of small size that is readily controlled. Since there is no need to separate a filtrate from a solute, the difficulties which arose heretofore from iron and aluminum precipitates is avoided. Also the initial investment of the apparatus is reduced because the use of the filtration and drying step of the heretofore known process is eliminated. According to the process of the present invention both the fixed and free ammonia are removed from the coke oven gas to provide a relatively pure ammonia gas and this ammonia gas is contacted with commercial phosphoric acid (75% phosphoric acid) without any substantial dilution. The relatively thick, mud-like material produced by the reaction is dried by a process of evaporation without the intermediate use of filters or centrifugal dryers.

Although several embodiments of the invention have been illustrated and described in detail, it is to be expressly understood that the invention is not limited thereto. Various changes and modifications can be made in the details without departing from the spirit and scope of the invention as will now be understood by those skilled in the art.

What is claimed:

1. A process for the production of diammonium phosphate from the ammonia of coke oven gas containing ammonia and other water soluble constituents, which process comprises washing said gas with water to absorb said ammonia and said other water soluble constituents in said water, steam distilling said water under controlled conditions to separate said other water soluble constituents from said water and under conditions to separate the ammonia from the water in the form of a concentrated relatively pure ammonia vapor, contacting said ammonia vapor with concentrated phosphoric acid at a reduced temperature and acid conditions to produce a slurry of diammonium phosphate having a pH value ranging between about 5.5–8, drying said slurry, and thereafter granulating said dried diammonium phosphate to a desired size.

2. The production of diammonium phosphate from the ammonia of coke oven gas containing ammonia and other water soluble constituents by a process which comprises washing said gas with water to absorb said ammonia and said other water soluble constituents in said water, stripping from said water said other constituents with steam, thereafter stripping the ammonia from said water to provide a concentrated ammonia vapor, contacting said vapor with concentrated phosphoric acid during agitation and cooling to produce a slurry of diammonium phosphate having a pH value ranging between about 5.5–8, drying said slurry, compacting said dried slurry to form a sheet, granulating said granules to obtain granules of a predetermined size, regranulating oversize granules, and adding undersized granules to the dried slurry prior to the compacting thereof.

3. A process for the production of diammonium phosphate from the ammonia of coke oven gas containing ammonia and other water soluble constituents, which process comprises washing said gas with water to absorb said ammonia and said other water soluble constituents in said water, stripping from said water said other water soluble constituents, thereafter stripping the ammonia from said water to provide a concentrated ammonia vapor, contacting said ammonia vapor with concentrated phosphoric acid during agitation and cooling to produce a slurry of diammonium phosphate, drying said slurry, compacting said dried slurry, screening said dried slurry to obtain granules of predetermined size, grinding oversized granules and returning the granulated material to said screening step, dissolving undersized granules in an aqueous solution, and adding said solution to the step of contacting said vapor with concentrated phosphoric acid.

4. A process for the production of diammonium phosphate from the ammonia of coke oven gas containing ammonia and other water soluble constituents, which process comprises washing said gas with water to absorb said ammonia and said other water soluble constituents in said water, stripping from said water said other water soluble constituents, thereafter stripping the ammonia from said water to provide a concentrated ammonia vapor, contacting said ammonia vapor with concentrated phosphoric acid solution to provide a concentrated solution of acid and ammonium phosphate heated to the boiling point of the solution, adding additional ammonia to said solution while cooling and agitating said solution to form a slurry of diammonium phosphate having a pH value ranging between about 5.5–8, drying said slurry, compacting said dried slurry to form a sheet, and granulating said sheet to obtain dried diammonium phosphate granules of a desired size.

5. A process for the production of diammonium phosphate from the ammonia of coke oven gas which includes ammonia and other water soluble constituents, which process comprises washing said gas with water to absorb said ammonia and said other water soluble constituents in said water, stripping from said water said other water soluble constituents with steam, adding milk of lime to said water and further stripping said water with steam so as to free the fixed ammonia compounds as ammonia vapors, washing said last named vapors from said last-named stripping operation with water to remove the remaining traces of said compounds whereby the vapors remaining comprise water vapor and substantially pure ammonia vapor, contacting said remaining vapors with concentrated phosphoric acid during agitation and cooling to produce a mudlike slurry of diammonium phosphate having a pH value ranging between about 5.5–8, partially drying said slurry, compacting said partially dried slurry to form a sheet, further drying and aging said sheet, granulating said sheet, and screening said granules to obtain granules of diammonium phosphate of a predetermined size.

6. A process for the production of diammonium phosphate from the ammonia in coke oven gas containing ammonia and other water soluble constituents, which process comprises absorbing the ammonia and said other water soluble constituents from said gas in water, separating from said water said other water constituents, thereafter separating the ammonia from said water so as to obtain a concentrated ammonia vapor, contacting said vapor with concentrated phosphoric acid so as to produce a solution substantially saturated with ammonium phosphate at the boiling point of the solution, thereafter contacting said hot solution with said ammonia vapor while cooling and agitating the solution to produce a slurry of diammonium phosphate having a pH value ranging between about 5.5–8, drying said slurry and granulating the dried slurry to desired sized granules of diammonium phosphate.

7. The production of diammonium phosphate from the ammonia in coke oven gas containing ammonia, water soluble constituents and water insoluble constituents by a process which comprises removing from the gas said water insoluble constituents which are insoluble in water, absorbing the ammonia and said water soluble constituents from said gas in water, separating from said water said other water constituents, thereafter separating the ammonia from the water to provide a concentrated ammonia vapor, contacting said vapor with concentrated phosphoric acid to produce a slurry of diammonium phosphate having a pH value ranging between about 5.5–8, drying said slurry to form a sheet, and granulating said sheet to desired sized granules of diammonium phosphate.

8. A process for the production of diammonium phosphate from the ammonia in coke oven gas containing ammonia and other water constituents, which process comprises absorbing the ammonia and said other water soluble constituents from said gas in water, separating from said water said other water soluble constituents, thereafter separating the ammonia from said water to obtain a concentrated ammonia vapor, contacting said ammonia vapor with concentrated phosphoric acid to produce a solution substantially saturated with ammonium phosphate at the boiling point of the solution, thereafter contacting said hot solution with ammonia vapor while cooling and agitating the solution to produce a slurry of diammonium phosphate having a pH value ranging between about 5.5–8, adding a potassium compound to said slurry whereby the final product is a balanced fertilizer having a desired nitrogen, potassium and phosphate ratios, drying said slurry and granulating the dried slurry to desired sized granules.

9. A process for the production of diammonium phosphate from the ammonia in coke oven gas containing ammonia and other water soluble constituents, which process comprises absorbing said ammonia and said other water soluble constituents in water, separating from said water, said other water soluble constituents thereafter separating the ammonia from said water to provide a concentrated ammonia vapor, mixing said vapor with concentrated phosphoric acid while cooling and agitating said mixture to produce a slurry of diammonium phosphate, adding a potassium compound to said slurry whereby the final product is a balanced fertilizer having a desired nitrogen, potassium, and phosphate ratios, drying said slurry to form a sheet, compacting said sheet, and thereafter granulating said sheet to form granules of a desired size.

References Cited in the file of this patent

UNITED STATES PATENTS

| | | |
|---|---|---|
| 1,266,147 | Ore | May 14, 1918 |
| 1,822,040 | Klugh et al. | Sept. 8, 1931 |
| 2,033,388 | Moose | Mar. 10, 1936 |
| 2,040,563 | Phillips | May 12, 1936 |
| 2,106,734 | Gollmar | Feb. 1, 1938 |
| 2,830,036 | O'Donnell | Apr. 8, 1958 |